United States Patent
Hartung et al.

(10) Patent No.: US 10,581,098 B2
(45) Date of Patent: Mar. 3, 2020

(54) METHOD FOR STARTING A FUEL CELL SYSTEM AND A FUEL CELL SYSTEM

(71) Applicants: VOLKSWAGEN AG, Wolfsburg (DE); AUDI AG, Ingolstadt (DE)

(72) Inventors: Ingmar Hartung, Braunschweig (DE); Maren Ramona Kirchhoff, Braunschweig (DE); Martin Arendt, Lauenburg (DE); Heiko Turner, Vechelde (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 55 days.

(21) Appl. No.: 15/615,689

(22) Filed: Jun. 6, 2017

(65) Prior Publication Data

US 2017/0352901 A1 Dec. 7, 2017

(30) Foreign Application Priority Data

Jun. 7, 2016 (DE) .......................... 10 2016 110 451

(51) Int. Cl.
*H01M 8/04302* (2016.01)
*H01M 8/04746* (2016.01)
(Continued)

(52) U.S. Cl.
CPC ... *H01M 8/04302* (2016.02); *H01M 8/04097* (2013.01); *H01M 8/04111* (2013.01);
(Continued)

(58) Field of Classification Search
CPC ............................................... H01M 8/04302
See application file for complete search history.

(56) References Cited

U.S. PATENT DOCUMENTS 3,559,373 A * 2/1971 Garret ................... B01D 45/16
204/157.21
7,807,308 B2 10/2010 Robb et al.
(Continued)

FOREIGN PATENT DOCUMENTS

DE 10 2008 047 390 A1 4/2009
DE 10 2008 051 964 A1 5/2009
(Continued)

*Primary Examiner* — Ula C Ruddock
*Assistant Examiner* — Thomas H. Parsons
(74) *Attorney, Agent, or Firm* — Seed Intellectual Property Law Group LLP

(57) ABSTRACT

The invention relates to a starting method for a fuel cell system (100), particularly for an air/air start of the fuel cell system (100). The method enables the reduction of damaging half-cell voltages in the fuel cell stack (10) through voltage limitation by means of a DC voltage converter. The homogeneous flushing of the fuel cell stack (10) required for this takes place by means of introduction of an anode operating medium into an anode inlet channel (17) of the otherwise sealed fuel cell stack (10) until a predetermined pressure is reached and flushing of the active areas of the fuel cells (11) of the stack (10) after said pressure is reached through opening of an anode discharge adjusting aid (26), preferably arranged in an exhaust coupling (29) connecting the anode exhaust line (22) and the cathode exhaust line (31). In preferred embodiments of the method according to the invention, a provision is to improve the mass flow of the anode operating medium in an anode supply (20) of the fuel cell stack (10) through suitable operation of a recirculation conveying mechanism (27). Another subject matter of the invention is also a fuel cell system (100) with a control unit (70) for implementing the method according to the invention.

10 Claims, 3 Drawing Sheets

(51) Int. Cl.
    *H01M 8/04089*     (2016.01)
    *H01M 8/04111*     (2016.01)
    *H01M 8/04082*     (2016.01)
    *H01M 8/0438*     (2016.01)
    *H01M 8/04537*     (2016.01)
    *H01M 8/1018*     (2016.01)

(52) U.S. Cl.
    CPC ... *H01M 8/04201* (2013.01); *H01M 8/04388* (2013.01); *H01M 8/04559* (2013.01); *H01M 8/04761* (2013.01); *H01M 2008/1095* (2013.01); *H01M 2250/20* (2013.01)

(56) References Cited

U.S. PATENT DOCUMENTS

| | | | |
|---|---|---|---|
| 8,057,942 B2 | 11/2011 | Machuca et al. | |
| 8,097,375 B2 | 1/2012 | Robb et al. | |
| 8,173,308 B2 * | 5/2012 | Heidrich | H01M 8/04141 429/413 |
| 9,017,886 B2 * | 4/2015 | Harris | H01M 8/04302 429/429 |
| 9,509,004 B2 | 11/2016 | Jomori et al. | |
| 2008/0091629 A1 * | 4/2008 | Matsumoto | H01M 8/04303 706/14 |
| 2010/0190075 A1 * | 7/2010 | Frost | H01M 8/04231 429/433 |

FOREIGN PATENT DOCUMENTS

| | | |
|---|---|---|
| DE | 10 2009 004 378 A1 | 8/2009 |
| DE | 11 2013 006 841 T5 | 12/2015 |

* cited by examiner

METHOD FOR STARTING A FUEL CELL SYSTEM AND A FUEL CELL SYSTEM

The invention relates to a method for starting a fuel cell system as well as a fuel cell system set up to implement said starting method.

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane-electrode arrangement, on the sides of the electrodes facing away from the membrane.

Generally, the fuel cell is formed by a plurality of MEAs arranged in a stack, the electrical power outputs of which add up. Bipolar plates (also called flux field plates or separator plates), which ensure a supply of the individual cells with the operating media, i.e. the reactants, and which are usually also used for cooling, are usually arranged between the individual membrane electrode assemblies. In addition, the bipolar plates also ensure an electrically conductive contact to the membrane electrode assemblies.

During operation of the fuel cell, the fuel (anode operating medium), in particular hydrogen, is supplied to the anode via a flux field of the bipolar plate and oxidized to protons electrochemically with release of electrons ($H_2 \rightarrow 2H^+ + 2\ e^-$). A transport of the protons from the anode chamber into the cathode chamber is effected via the electrolytes or the membrane, which separates the reaction chambers from each other in a gas-tight and electrically insulated manner. The electrons provided at the anode are guided to the cathode via an electrical line.

During operation of the fuel cell, the cathode is supplied with oxygen or an oxygen-containing gas mixture (for example air) as a cathode-operating medium, so that a reduction of $O_2$ to $O^{2-}$ takes place with the gain of electrons ($\frac{1}{2}O_2 + 2\ e^- \rightarrow O^{2-}$). At the same time, the oxygen anions react with the protons transported across the membrane to form water ($O^{2-} + 2H^+ \rightarrow H_2O$) in the cathode chamber.

The fuel cell stack is supplied with its operating media, that is the anode operating gas (hydrogen for example), the cathode operating gas (air for example), and the coolant by means of the main supply channels, which run through the stack in its entire stack direction and from which the operating media are supplied to the individual cells via the bipolar plates. There are at least two such main supply channels available for each operating medium, namely one for supplying and one for discharging the respective operating medium. End plates or unipolar plates are arranged at both ends of the fuel cell stack in order to keep it together and press the stack components together. The compression pressure contributes to sealing of the stack and ensures adequate electrical contact between the stack components.

During switch-off of a fuel cell system, the fuel cell stack is isolated from an electrical load and stops the supply of operating media to the stack. It is known that air penetrates to the anode and the cathode side of the stack after switch-off. When the system is restarted, a so-called air/air start must take place, in which the air present on the anode side must be removed from the stack and be replaced by the anode operating medium, particularly hydrogen. In doing so, the uncontrolled abreaction of oxygen and hydrogen occurs. Thereby high voltages occur, which damage the cells, for example by oxidization of the carbon-containing anode carrier.

Methods for the air/air start of fuel cell stacks are known from the state of the art. Thereby the aim is normally, on the one hand, to remove the air present on the anode side, by setting a high volumetric flow, from the stack as quickly as possible. The removal of air and/or the subsequent introduction of hydrogen into the fuel cell stack here frequently takes place unevenly due to the design. On the other hand, the high voltages can be reduced by applying an electrical load. Due to the uneven introduction of the hydrogen here, however, typically results in potential differences between the fuel cells connected in series, which can cause a damaging reversal of voltage in the fuel cells that generate less current than adjacent cells due to the lower hydrogen concentration. Electrochemical reactions occur again in the fuel cells with reversed polarity, which damage the cells, particularly their catalytic electrodes.

The object of the invention is thus to overcome the disadvantages of the state of the art and to provide a method for starting a fuel cell system that enables a reliable, time-saving, and fuel-saving starting of the fuel cell system, and that will be gentle on the fuel cell stack, even during an air/air start of the fuel cell stack. The method should further only require a few modifications to the existing fuel cell systems. Furthermore, a fuel cell system should be provided for implementing the start method.

The object is achieved by the subject matter of the independent claims and particularly by a method for starting a fuel cell system having a fuel cell stack with an anode inlet channel for supplying an anode operating media to a plurality of fuel cells, an anode supply with an anode supply line for supplying the anode operating medium to the anode inlet channel, an anode exhaust line, and an anode discharge adjusting means connected to the anode exhaust line, and at least one sensor for recording a pressure in the anode inlet channel.

The method according to the invention for starting said fuel cell system has at least the following process steps: Blocking of the anode discharge adjusting aid, recording the pressure in the anode inlet channel, introduction of the anode operating media into the anode supply line until the predetermined pressure in the anode inlet channel is achieved, and opening of the anode discharge adjusting aid after, or preferably during, achieving of the predetermined pressure in the anode inlet channel. With the predetermined pressure, the anode operating media is evenly distributed in the anode inlet channel and not in the plurality of fuel cells. The target value of the method according to the invention is consequently the pressure in the anode inlet channel. If this is achieved, the flushing (blowout) of the plurality of fuel cells, particularly of the active areas, with the anode operating medium and the discharging of the mixed gas present in the stack from the supplied anode operating medium and the air previously penetrated into the stack occurs via the anode discharge adjusting aid.

The target pressure is adjusted by introducing anode operating medium into the inlet channel with the anode discharge adjusting aid closed. The medium previously present in the fuel cell stack, particularly air that entered, is preferably completely displaced out of the anode inlet channel, but does not leak from the stack and is compressed therein. Said medium thereby establishes a static pressure or a dynamic pressure, which preferably corresponds to the predetermined pressure or falls slightly below it. According to the invention, the predetermined pressure thus is selected such that a boundary surface is present between the compressed medium, particularly air, and the anode operating medium at the transition from the anode inlet channel and the distribution areas of the fuel cells or in the anode-side distribution areas of the fuel cells, but not in the active areas of the fuel cells, when the predetermined pressure is reached.

The predetermined pressure is preferably selected such that the pressure of a medium penetrating into the fuel cell stack, particularly air, which was completely pushed out of the anode inlet channel and into the active areas of the fuel cells, corresponds to the predetermined pressure or falls slightly below it. Likewise preferable, the predetermined pressure is selected such that the pressure of a medium penetrating into the fuel cell stack, particularly air, which was completely pushed out of the anode inlet channel and into the inlet-side distribution areas and the active areas of the fuel cells, corresponds to the predetermined pressure. The inlet-side distribution areas here are arranged between the anode inlet channel and the active areas of the fuel cells. Likewise preferable, the predetermined pressure is selected such that the pressure of a medium penetrating into the fuel cell stack, particularly air, which was completely pushed out of the anode inlet channel and into the inlet-side distribution areas, the active areas, into the outlet-side distribution areas of the fuel cells, and into the anode discharge channel of the fuel cell stack, corresponds to the predetermined pressure. The outlet-side distribution areas here are arranged between the anode outlet channel and the active areas of the fuel cells.

Until the opening of the anode discharge adjusting aid, the anode operating medium thus does not penetrate into the active areas of the fuel cells and a degradation of the fuel cells is minimized and ideally practically completely avoided according to the invention. When the anode discharge adjusting aid is open, the compressed medium relaxes in that it exits the fuel cell stack by means of the anode exhaust line and the anode discharge adjusting aid. Due to the predetermined pressure, the front between the anode operating medium and the compressed medium (anode operating medium front) pushes through the active area of the fuel cells of the stack in a short time. Thus, the impact of the mixed potentials associated with the front on the fuel cells as well as the total time of the start method is reduced.

The anode operating medium is introduced into the anode inlet channel such that it is evenly distributed in the anode inlet channel when the predetermined pressure is reached. Thus, the anode operating medium front pushes through the active areas of all fuel cells of the fuel cell stack evenly and with a homogeneous hydrogen concentration when the fuel cells are flushed after the opening of the anode discharge adjusting aid. Because of the homogenized anode operating media front in the anode inlet channel, the pole reversals of cells otherwise occurring in this process due to locally different hydrogen concentrations between adjacent cells are avoided. The uniform distribution of the anode operating medium in the anode inlet channel is preferably achieved through a comparatively slow filling of the anode inlet channel with a first pressure ramp with a smaller increase. Likewise preferably, further anode operating medium is also introduced into the anode inlet channel of the fuel cell stack after the opening of the anode discharge adjusting aid.

In a preferred embodiment of the method, the fuel cell system further has a cathode supply with a first cathode separator arranged in a cathode supply line and with a second cathode separator arranged in a cathode exhaust line. The first step of the method according to the invention is then preferably: Blocking of the anode discharge adjusting aid, of the first cathode separator, and of the second cathode separator. Advantageously, the cathode areas of the fuel cells are thus separated from the environment. This then results in oxygen depletion on the cathode side, which weakens the damaging mixed potentials.

The cathode separators are preferably closed during the introduction of the anode operating medium into the anode inlet channel and during flushing of the active areas (blowout). Thus, the concentration of the cathode operating medium on the cathode sides of the fuel cells remains low during introduction and flushing. By means of this undersupply with cathode operating medium, particularly air, damaging potentials in the fuel cells are further reduced or avoided during the introduction and flushing. In particular, during the introduction of the anode operating medium, a low current is already flowing into the active areas of the fuel cells, which depletes the oxygen present on the cathode side of the stack and thus reduces the amount of the current flowing during the flushing.

In a likewise preferred embodiment of the method according to the invention for starting a fuel cell system, the fuel cell system further has a DC voltage converter. The method then has in addition the following step: Setting of a voltage limit of the DC voltage converter and establishing of an electrical connection between the DC voltage converter and at least one fuel cell of the fuel cell stack, preferably with the entire fuel cell stack, before or during the introduction of the anode operating medium into the anode supply line or before the opening of the anode discharge adjusting aid. In this embodiment, there is a limiting of the voltage of at least one fuel cell, preferably of the fuel cell stack. In particular, due to mixed potentials at the anode operating medium front, damaging voltages occurring from the fuel cell stack are diverted to the DC voltage converter. The voltage limitation is preferably continued as well during normal operation of the stack, wherein the voltage level may differ.

A DC voltage converter, particularly a DC buck converter, normally has an inherent voltage limitation. This is utilized to limit the stack voltage in that the DC voltage converter is switched in parallel or in series with the fuel cell stack. According to this embodiment, a voltage limitation (voltage clipping) advantageously takes place by means of a DC voltage converter already installed in fuel cell vehicles. Thus, additional resistive load, for example a bleed or shunt resistor, can advantageously be dispensed with and packaging space can be saved. An upper voltage limit of the DC voltage converter, up to which the voltage limitation takes place, is advantageously adjustable and is preferably reset before each start process.

In a further preferred embodiment of the method according to the invention, the fuel cell system further has a recirculation line connecting the anode supply line and the anode exhaust line to a recirculation conveying mechanism, preferably a recirculation flow machine, for example a blower, or a displacer machine, for example a recirculation centrifugal pump. The method then further has the following process step in this embodiment: Activating of the recirculation conveying mechanism after, or preferably during, achieving of the predetermined pressure in the anode inlet channel. The activating preferably takes place before or at the same time the anode discharge adjusting aid is opened. Due to the activating of the recirculation conveying mechanism, the volumetric flow of the anode operating medium through the fuel cell stack is increased and thus the dwell time of the anode operating medium front in the active areas of the fuel cell is reduced.

Further preferably, the recirculation conveying mechanism is activated during or shortly before the predetermined pressure is achieved, and the anode discharge adjusting aid is not opened until a predetermined conveying capacity of the recirculation conveying mechanism is reached. The reaching of the predetermined conveying capacity is preferably determined by means of a suitable sensor, for example by determining the power consumption of the recirculation conveying mechanism by means of a voltage sensor. According to this embodiment, the pressure difference between the anode inlet channel and the anode discharge adjusting aid is significantly increased the same time the anode discharge adjusting aid is opened. Thus, the dwell time of the anode operating medium front in the active areas is further reduced.

In a further preferred embodiment of the method according to the invention, the fuel cell system further has a conveying mechanism, for example a jet pump, arranged in the anode supply line. The method then has furthermore the following process steps: Introduction of the anode operating medium by means of a subcritical operation of the conveying mechanism and converting to a supercritical operation of the conveying mechanism after, or preferably during, achieving of the predetermined pressure in the anode inlet channel. The subcritical operation of the conveying mechanism implements the introduction of the anode operating medium into the anode inlet channel with the first pressure ramp and thus the creation of a most homogeneous anode operating medium front possible in the anode inlet channel. In addition, the vacuum on the suction side of the conveying mechanism is low in the subcritical operation. Within the scope of this application, the subcritical/supercritical operation characterizes particularly the operation of the conveying mechanism at a flow rate of the anode operating medium as a propelling medium below/above the speed of sound.

Because the suction side is frequently situated in the recirculation line, the occurrence of a vacuum in the recirculation line, the anode exhaust line, and the anode outlet channel is thus impeded by means of the subcritical operation regardless of whether the anode discharge adjusting means is arranged in or outside of an anode exhaust line connecting the anode discharge channel of the fuel cell stack to the recirculation line. This even more reliably facilitates the establishing of the predetermined pressure in the anode inlet channel and prevents suctioning of the anode operating medium into the active areas of the stack before opening of the anode discharge adjusting aid. In addition, a recirculation of the fluid (air) that penetrated into the anode operating medium is avoided.

By converting the operation of the conveying mechanism to a supercritical operation upon achieving the predetermined pressure, the volumetric flow of the anode operating medium conveyed by the conveying mechanism and the volumetric flow circulated through the recirculation line are further increased. This therefore reduces the dwell time of the anode operating medium front in the active areas of the fuel cell further. In addition, the conveying mechanism definitively contributes to the establishment of a volumetric flow during supercritical operation by means of the recirculation line. Thus, a vacuum is established in the anode exhaust line and the anode outlet channel, which increases the pressure difference between the anode inlet channel and the anode outlet channel. In other words, after the predetermined pressure is reached, the pressure of the anode operating medium is further increased by the introduction of additional operating medium via the pressure control valve and/or the jet pump, namely with a second pressure ramp, which has a stronger incline than the first pressure ramp.

In a further preferred embodiment of the method according to the invention, it has, furthermore the following process steps: Blocking of the recirculation line or operating of the recirculation conveying mechanism in reverse mode during introduction of the anode operating medium and unblocking of the recirculation line or converting of the operation of the recirculation conveying device to normal mode when the predetermined pressure is reached in the anode inlet channel and before the anode discharge adjusting aid is opened. The blocking of the recirculation line, optionally by means of the reverse mode of the recirculation conveying mechanism, prevents recirculation of the medium that penetrated into the stack, particularly air, into the anode operating medium and into the stack. In particular, it prevents the occurrence of a vacuum on the anode outlet side in the fuel cell stack and thus enables the adjusting of the predetermined pressure in the anode inlet channel in that it enables the establishing of sufficient counter-pressure by the compressed medium.

The blocking of the recirculation line preferably takes place by means of an adjusting aid situated in the line, for example a shut-off valve or a controllable flap. In the event of a recirculation conveying mechanism that is not overflowable, for example a blower, the blocking of the recirculation line preferably takes place by means of a mechanical or electrical rotation block. Alternatively preferably, the blocking of the recirculation line takes place by means of reverse mode of the recirculation conveying mechanism, i.e. the operation thereof with a conveying direction from the anode supply line toward the anode exhaust line.

The unlocking or opening of the recirculation line when the predetermined pressure is reached and preferably before opening of the anode discharge adjusting aid is necessary in order to enable the previously described activating of the recirculation conveying mechanism. The opening of the recirculation line takes place, for example, by means of the opening of the shut-off valve, loosening of the electrical mechanical rotation block, or by means of converting the operation of the recirculation conveying mechanism to normal mode, that is, to the operation thereof with a conveying direction from the anode exhaust line toward the anode supply line.

In a further preferred embodiment of the method according to the invention, the fuel cell system further has a voltage sensor for recording an electrical stack voltage. The method then further has the following process steps: Recording of a stack voltage according to a predetermined first time frame; determining of a second time frame by means of the recorded stack voltage; closing of the anode discharge adjusting aid after the first time frame and the second time frame have elapsed and/or when a predetermined concentration of anode operating medium in the fuel cell stack and/or in one of its exhaust flows is exceeded, and/or when a voltage and/or current plateau is reached.

According to this embodiment, the quantity of the anode operating medium placed in the fuel cell stack, particularly hydrogen, after a predetermined first time frame, is estimated in a ratio to the medium still in the stack, particularly air, by means of the stack voltage already present at this point in time, particularly in a ratio to a known stack voltage in normal mode. This estimating preferably takes place after a first predetermined time frame after the anode discharge adjusting aid is opened. By means of the estimate result, a second time frame is determined, in which the second time frame is positively correlated to the voltage recorded after the first time frame has elapsed. After the second time frame has elapsed after the time of the estimation, that is after the first and the second time frame have elapsed, the anode discharge adjusting means is closed in order to introduce a normal mode of the stack. Alternatively, the anode discharge adjusting aid is closed when a predetermined concentration of the anode operating medium in the fuel cell stack and/or in one of its exhaust flows, preferably in an anode discharge channel of the stack, is determined. In this case, the stack has a corresponding gas sensor, preferably close to the anode discharge channel.

Likewise preferably, the fuel cell system furthermore has an exhaust coupling connecting the anode exhaust line and the cathode exhaust line, and the anode discharge adjusting means is arranged in the exhaust coupling. Thus, the fuel cell stack is finally ventilated by means of the cathode exhaust line. This enables the dilution of any flushed anode operating medium with the air suctioned in the cathode supply. In an alternative embodiment, the anode discharge adjusting aid may also, however, be arranged in an anode exhaust line or an anode outlet channel.

In a further preferred embodiment of the method according to the invention, the fuel cell system further has a compressor arranged in the cathode supply line and a wastegate line connecting the cathode supply line and the cathode exhaust line to a wastegate adjusting aid. The method then further has the following process steps: Activating of the compressor when the waste gate adjusting means is open before opening of the anode discharge adjusting aid or activating of the compressor with the wastegate adjusting aid open after opening of the anode discharge adjusting aid and before opening of the second cathode separating aid.

The operation of the compressor by means of the wastegate line creates a mass flow of the cathode operating medium (air mass flow) in the cathode exhaust line, which is necessary and sufficient for diluting fuel discharged from the stack during flushing. In order to determine whether the introduction of fuel into the cathode exhaust line can reliably occur, a mass flow is measured in the cathode exhaust line and the opening of the anode discharge adjusting aid preferably takes place when a predetermined target mass flow is reached in the cathode exhaust line. A sensor for determining a cathode operating medium mass flow is preferably situated in the cathode exhaust line and/or in the wastegate line.

In a further preferred embodiment of the method according to the invention, it further has the following process steps: Closing of the waste gate adjusting aid by means of a control process, opening of the first cathode separator and of the closed second cathode separator, and converting to a controlled operation of the wastegate adjusting aid. In other words, a closed-loop control operation of the wastegate adjusting aid follows an open loop controlled closing of the wastegate adjusting aid before the connecting of the cathode supply to the fuel cell stack. Thus, undesired fluctuations in the adjusting means are advantageously avoided.

A likewise subject matter of the invention is a fuel cell system having a fuel cell stack with an anode inlet channel for supplying an anode operating medium to a plurality of fuel cells, an anode supply with an anode supply line for supplying the anode operating medium to the anode inlet channel and with an anode exhaust line, a cathode supply with a first cathode separator situated in a cathode supply line and with a second cathode separator situated in a cathode exhaust line, an exhaust coupling connecting the anode exhaust line and the cathode exhaust line to an anode discharge adjusting aid, an electrically connectable DC voltage converter with at least one fuel cell, preferably the fuel cell stack, a recirculation line connecting the anode supply line and the anode exhaust line to a recirculation conveying mechanism, a compressor arranged in the cathode supply line and a waste gate line connecting the cathode supply line and the cathode exhaust line to a wastegate adjusting aid, a conveying mechanism situated in the anode supply line, a sensor for determining a pressure in the anode inlet channel, a voltage sensor for detecting an electrical stack voltage, and a control unit that is set up for implementing a process as previously described. A likewise subject matter of the invention is a vehicle with such a fuel cell system.

Additional preferred embodiments of the invention arise from the other features stated in the dependent claims.

The various embodiments of the invention mentioned in this application may be combined advantageously with one another unless stated otherwise in individual cases.

The invention is explained below in exemplary embodiments on the basis of the respective drawings. The following is shown:

FIG. 1 shows a fuel cell system, denoted overall by 100, according to a preferred embodiment of the present invention. The fuel cell system 100 is part of a vehicle (not shown), in particular an electric vehicle, which has an electric traction motor, which is supplied with electrical energy by the fuel cell system 100.

Figure 1:
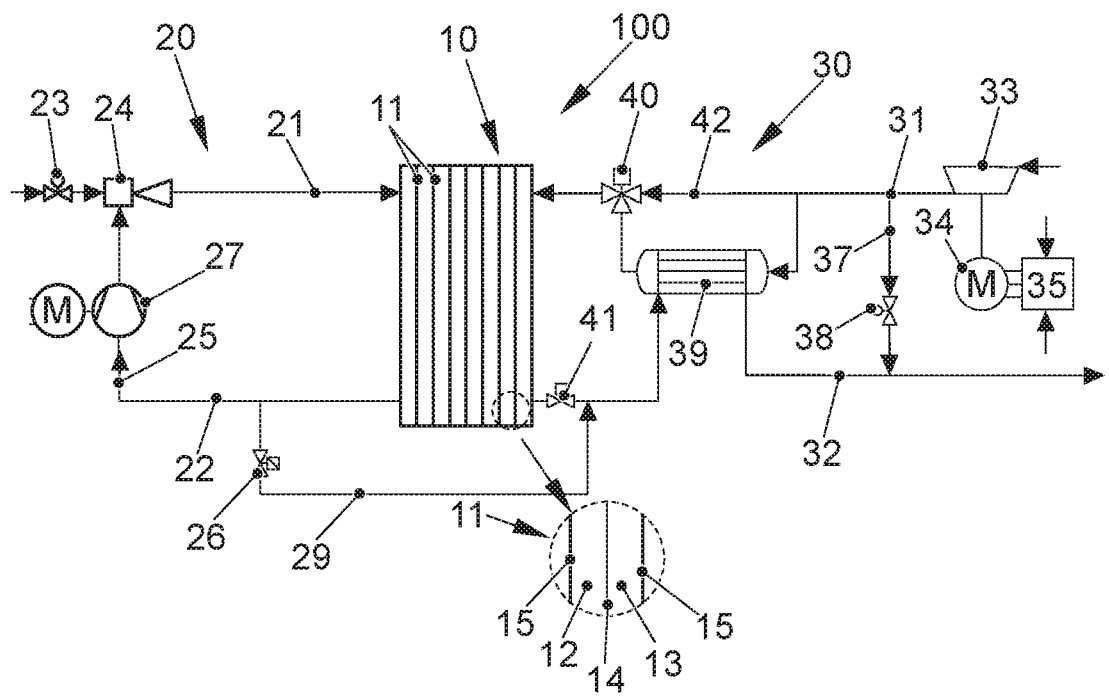
FIG. 1 shows a block diagram of a fuel cell system according to a preferred embodiment.

The fuel cell system 100 comprises, as core components, a fuel cell stack 10, which has a plurality of individual cells 11, which are arranged in the form of a stack and which are formed by alternately stacked membrane electrode assemblies (MEAs) 14 and bipolar plates 15 (see detailed view). An individual cell 11 thus respectively comprises an MEA 14 with an ion-conductive polymer electrolyte membrane, not shown in more detail here, and catalytic electrodes arranged thereon on both sides. The electrodes, an anode, and a cathode catalyze the respective partial reaction of the fuel cell conversion and are respectively formed as a coating on the membrane.

The anode and cathode electrodes have catalytic material (for example platinum), which is supported on electrically conductive carrier material with a large specific surface (for example a carbon-based material). An anode chamber 12 is formed between a bipolar plate 15 and the anode, and the cathode chamber 13 is formed between a cathode and a bipolar plate 15. The bipolar plates 15 serve to supply the operating media to the anode and cathode chambers 12, 13 and also establish the electrical connection between the individual fuel cells 11. Optionally, gas diffusion layers are arranged between the MEA 14 and the bipolar plates 15.

In order to supply the fuel cell stack 10 with the operating media, the fuel cell system 100 has an anode supply 20 and a cathode supply 30.

The anode supply 20 comprises an anode supply line 21, which supplies an anode operating medium, for example hydrogen, as fuel to the anode chambers 12 of the fuel cell stack 10. To this end, the anode supply line 21 connects a fuel reservoir and a jet pump 24 to an anode inlet of the fuel cell stack 10 via a metering valve 23. The anode exhaust line 22 discharges the anode exhaust gas from the anode chambers 12 via an anode outlet of the fuel cell stack 10.

The anode operating pressure on the anode sides 12 of the fuel cell stack 10 can be adjusted via the metering valve 23 and a jet pump 24 in the anode supply line 21. Furthermore, the anode supply 20 has a fuel recirculation line 25, which connects the anode exhaust line 22 to the anode supply line 21. The recirculation of fuel is customary in order to return the overly-stoichiometric supplied fuel to the stack 10 and to use it. A recirculation conveying mechanism 27 is arranged in the fuel recirculation line 25.

An exhaust coupling 29, which connects the anode exhaust line 22 to the cathode exhaust line 32, branches into the anode exhaust line 22. An anode discharge adjusting means 26 is situated in the exhaust coupling 29. Thus, the anode exhaust and the cathode exhaust together can be discharged via a cathode exhaust line 32.

The cathode supply 30 comprises a cathode supply line 31 for supplying an oxygen-containing cathode operating medium, particularly from air suctioned from the environment, to the cathode chambers 13 of the fuel cell stack 10. The cathode supply 30 further comprises the cathode exhaust line 32, which discharges the cathode exhaust gas (particularly exhaust air) from the cathode chambers 13 of the fuel cell stack 10. The fuel cell stack 10 can be separated from the cathode supply 30 by means of a first cathode shut-off valve 40 situated in the cathode supply line 31 and a second cathode shut-off valve 41 situated in the cathode exhaust line 32, in which no gas exchange takes place between the fuel cell stack 10 and the cathode supply 30.

A compressor 33 for conveying and compressing the cathode operating medium is arranged in the cathode supply line 31. In the embodiment shown, the compressor 33 is designed as a compressor which is driven mainly by an electric motor, the drive of which is effected via an electric motor 34 equipped with a corresponding power electronics system 35.

The cathode supply 30 further has a wastegate line 37 for connecting the cathode supply line 31 to the cathode exhaust line 32, i.e., a bypass of the fuel cell stack 10. An air mass flow or an air volume flow can be moved to the fuel cell stack 10 by means of the wastegate line 37. A wastegate adjusting means 38 arranged in the wastegate line 37 serves to control the amount of the cathode operating medium bypassing the fuel cell stack 10.

The fuel cell system 100 further has a humidifier 39, which is permeable to water vapor. On one hand, the humidifier 39 is arranged in the cathode supply line 31 in such a way that cathode operating gas flows through it. On the other hand, it is arranged in the cathode exhaust line 32 such that the cathode exhaust gas can flow through it. In doing so, the comparatively dry cathode operating gas (air) flows over one side of the humidifier and the comparatively humid cathode exhaust gas (exhaust gas) flows over the other side. Driven by the higher partial pressure of the water vapor in the cathode exhaust gas, water vapors pass over the membrane into the cathode operating gas and this causes the humidification thereof.

Figure 2:
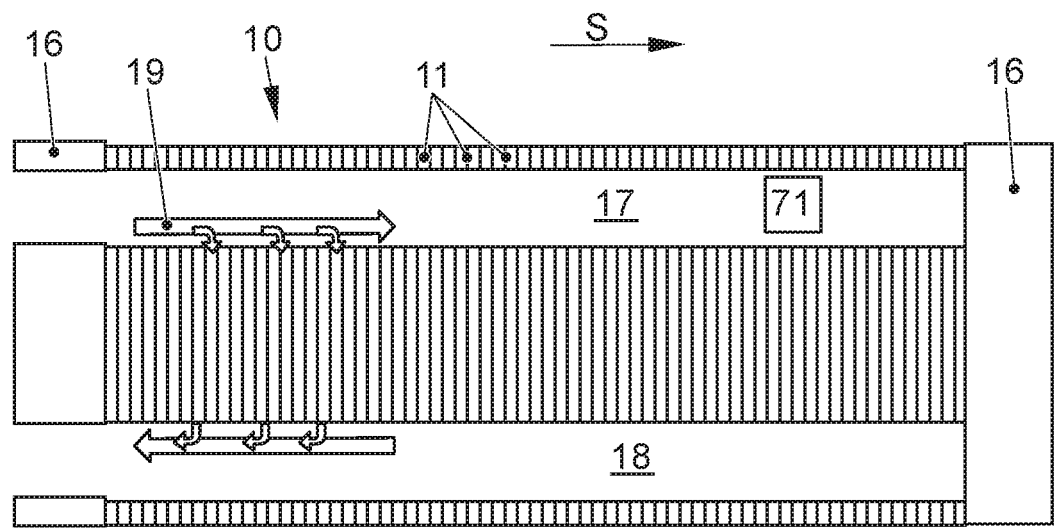
FIG. 2 shows a sectional view of a fuel cell system according to a preferred embodiment.

FIG. 2 shows a sectional view of the fuel cell stack 10, which has a discernible plurality of stacked individual cells 11, which are formed by alternately stacked membrane electrode assemblies 14 and bipolar plates 15. The individual cells 11 are pressed together and held together, sealed in a fluid-tight manner, by two end plates 16. They are clamped together via clamping devices (not shown). In the representation according to FIG. 2, the left end plate 16 is formed as a media supply plate in that it has corresponding connections for the supply and discharge line 20, 30 of the anode operating medium. The end plate 16 downstream of the flow of operating medium is arranged on the right.

FIG. 2 further exemplary shows an anode inlet channel 17 for supplying an anode operating medium 19 for the fuel cell stack 10 as well as an anode outlet channel 18 for discharging the anode operating medium 19. The anode operating medium 19 is placed in the main supply channel 17 and flows through it using a corresponding connection on the media supply plate 16, shown on the left. From there, it is distributed to the individual cells 11 of the stack. After flowing over the active catalytic areas of the membrane electrode assembly 14 of the individual cells 11, the anode operating medium 19 flows from the individual cells 11 as exhaust gas into the anode outlet channel 18, from where it is discharged from the stack 10 via the end plate 16.

Figure 3:
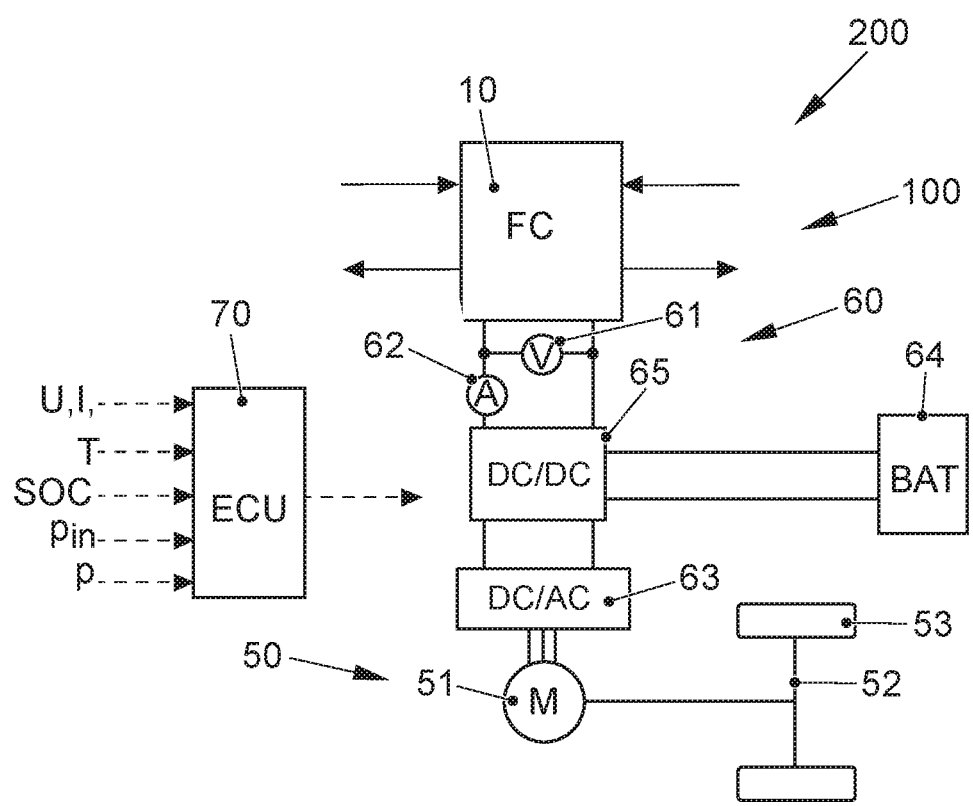
FIG. 3 shows a schematic representation of a fuel cell vehicle according to a preferred embodiment.

FIG. 3 shows a schematic representation of a fuel cell vehicle 200 according to a preferred embodiment of the present invention. The vehicle 200 shown in FIG. 3 has the fuel cell system 100 described in detail with reference to FIG. 1, the electronic control unit 70, an electrical power system 60, as well as a vehicle drive system 50.

The electrical power system 60 comprises a voltage sensor 61 for detecting a voltage generated by the fuel cell stack 10 and a current sensor 62 for detecting a current generated by the fuel cell stack 10. The electrical power system 60 further comprises an energy storage unit 64, such as a high-voltage battery or a capacitor. A converter 65, designed in triport topology (triport converter), is further arranged in the power system 60. The battery 64 is connected to a first side of the double DC/DC converter 65. The DC/DC converter 65 can be operated as a voltage limiter and can be switched for this purpose.

All traction network components of the drive system 50 are connected to a second side of the converter 65, with a fixed voltage level. In the same or a similar manner, the auxiliary units of the fuel cell system 100, for example the electric motor 34 of the compressor 33, or other electrical consumers of the vehicle, for example a compressor for a climate-control system or the like, are connected to the power network.

The drive system 50 comprises an electric motor 51, which serves as traction motor of the vehicle 200. To this end, the electric motor 51 drives a drive axle 52 with drive wheels 53 arranged thereon. The traction motor 51 is connected to the electrical power system 60 of the fuel cell system 100 via an inverter 63 and represents the main electrical consumer of the fuel cell system 100.

The electronic control unit 70 controls the operation of the vehicle 200 and particularly the fuel cell system 100, including its anode and cathode supply 20, 30, the electrical power system 60, and the traction motor 51. For this purpose, the control unit 70 receives different input signals, such as the voltage V of the fuel cell 10, detected using the voltage sensor 61, the current I of the fuel cell stack 10, detected using the current sensor 62 (from which the control unit calculates the current stack power $P_{stack}(t)$), information about the temperature T of the fuel cell stack 10, the pressures p in the anode and/or cathode chamber 12, 13, the charge state SOC of the energy storage unit 64, and the pressure $p_{in}$ in the anode inlet channel.

Figure 4:
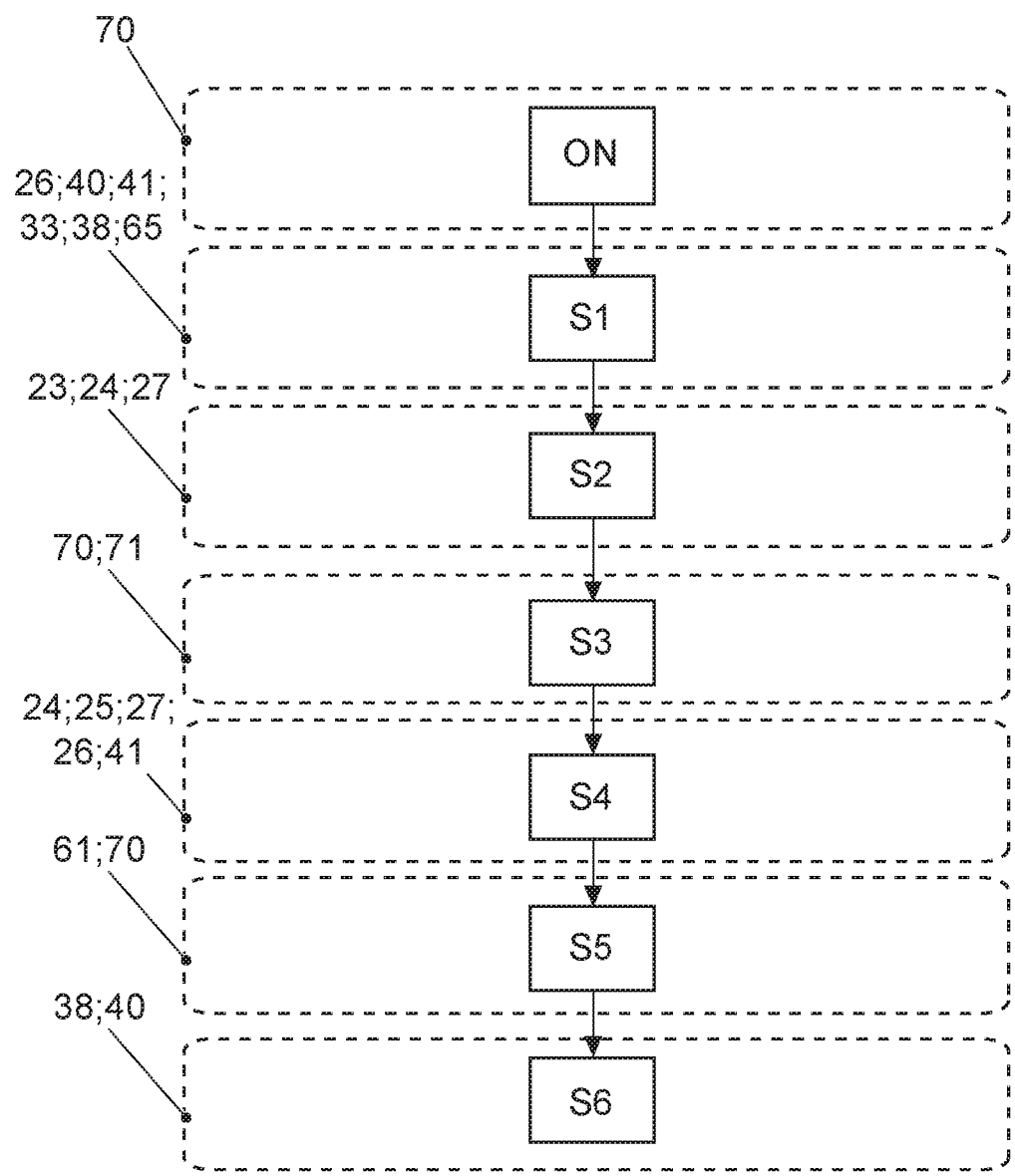
FIG. 4 shows a schematic block diagram of a method for starting a fuel cell system according to a preferred embodiment.

FIG. 4 shows a schematic block diagram of a preferred embodiment of the method according to the invention while using the fuel cell system 100 arranged in the vehicle 200, as shown in FIGS. 1 to 3.

The method according to the invention starts with the receiving of an "ON" control signal in the control unit 70 that shows a desired start of a fuel cell system.

In step S1, the control unit 70 closes the anode discharge adjusting aid 26 and the first and second cathode separating aid 40, 41. Subsequently, the control unit 70 opens the waste gate adjusting aid 38 and activates the compressor 33 positioned in the cathode supply 30. In doing so, the waste gate adjusting aid 38 is completely open such that an air mass flow of about 50 g/s is completely supplied via the wastegate line 37 of the cathode exhaust line 32. In addition, the control unit 70 connects the DC voltage converter 65 to the fuel cell stack 10 and sets an upper voltage limit of the DC voltage converter 65.

In step S2, the control unit 70 opens the metering valve 23 to a hydrogen reservoir, which is not shown, such that the mass flow exiting remains low to the extent that the conveying mechanism formed as the jet pump 24 is operated at subcritical level. Thus, the anode inlet channel 17 of the fuel cell stack 10 is filled with the hydrogen by means of a first pressure ramp of low rise. The air previously penetrating into the fuel cell stack 10 is pushed out of the anode inlet channel 17 and into the active areas of the fuel cells 11 and compressed in the anode outlet channel 18. Simultaneously, the control unit 70 activates the recirculation conveying mechanism 27 in a reverse mode, i.e. with a conveying direction from the anode supply line 21 toward the anode exhaust line 22. This additionally prevents this air, during the subcritical operation of the conveying mechanism 24, from being suctioned by means of the recirculation line 25 and supplied back into the stack 10.

In step S3, which starts at the same time as step S2, the control unit 70 monitors the pressure of the hydrogen in the anode inlet channel 17 by means of the pressure sensor 71. When a predetermined pressure is reached in the anode inlet channel 17, which is about 1.3 bar in the present case, the control unit 70 proceeds to the next process step S4.

In process step S4, the control unit 70 converts the conveying mechanism 24 from the subcritical to a supercritical operation by means of a fastest-possible pressure ramp and, in doing so, increases the mass flow being conveyed from the recirculation line 25 by the conveying mechanism 24 significantly. Simultaneously, the control unit 70 opens the anode discharge adjusting aid 26 and the second cathode separating aid 41. The established pressure means that the hydrogen that was previously evenly present in the anode inlet channel 17 is now introduced into the exhaust coupling 29 and into the cathode exhaust line 32 within a short time due to the active areas of the fuel cells 11 and by means of the anode outlet channel 18. The hydrogen is mixed with the air mass flow recirculated by the compressor 33 there and safely discharged into the environment.

In step S5, which takes place simultaneously with step S4, the control unit 70 measures an electronic voltage of the fuel cell stack 10 after a first predetermined time frame by means of the voltage sensor 61. The control unit 70 estimates the quantity of the air that previously penetrated from the measured voltage. Using this estimate, the control unit 70 determines a second time frame, after the elapsing of which it can be expected that the air will be pushed from the entire anode region and be replaced by a sufficient quantity of hydrogen. The total from the first time frame and the second time frame at present is between 40 and 500 ms. Based on the voltage limit set by the DC voltage converter 65, an electric current then flows, which limits the high cell voltages and thus the degradation of the fuel cell stack 10. Due to the not yet activated supply of the cathode side of the fuel cell stack 10, the oxygen still present is quickly depleted such that the electrical current is limited in a natural manner.

After the first and the second time frames have expired, the control unit 70 closes the anode discharge adjusting aid 26 and proceeds to process step S6 in that it initially closes the wastegate adjusting aid 38 in a controlled manner, which opens the first cathode separator 40 and then routes the airflow from the compressor 33 through the fuel cell stack 10. Subsequently, the control unit 70 transitions to a controlled operation of the wastegate adjusting aid 38 that discharges air to the fuel cell stack 10 via the wastegate line 37 according to a current power query. Once process step S6 is complete, the controllable air supply of the fuel cell stack 10 is then assured such that the electrical current then increases as soon as the hydrogen/air front on the anode has passed the stack 10. Thus, the control unit 70 transitions to normal mode of the fuel cell stack 10.

REFERENCE LIST

100 Fuel cell system
10 Fuel cell stack
11 Individual cell
12 Anode chamber
13 Cathode chamber
14 Membrane electrode assembly (MEA)
15 Bipolar plate (separator plate, flux field plate)
16 End plate/media supply plate/downstream plate
17 Anode inlet channel
18 Anode outlet channel
19 Operating medium/anode operating medium/hydrogen
20 Anode supply
21 Anode supply line
22 Anode exhaust line
23 Metering valve
24 Conveying mechanism/jet pump
25 Recirculation line
26 Anode discharge adjusting aid
27 Recirculation conveying mechanism
29 Exhaust coupling
30 Cathode supply
31 Cathode supply line
32 Cathode exhaust line
33 Compressor
34 Electric motor
35 Power electronics
37 Wastegate line
38 Wastegate adjusting aid
39 Humidifier module
40 First cathode separator
41 Second cathode separator
42 Air bypass
50 Drive system
51 Traction motor
52 Drive axle
53 Drive wheels
60 Electrical power system
61 Voltage sensor
62 Current sensor
63 Inverter
64 Energy storage unit
65 DC converter
70 Control unit
71 Pressure sensor
S Stack direction

The invention claimed is:

1. A method comprising:
   starting a fuel cell system, the fuel cell system including a plurality of fuel cells, the starting including:
   blocking an anode discharge adjusting means in an anode exhaust line of an anode supply;
   detecting a pressure in an anode inlet channel of a fuel cell stack of the fuel cell system;
   introducing an anode operating medium into an anode supply line until reaching a threshold pressure in the anode inlet channel;
   evenly distributing the anode operating medium in the anode inlet channel;
   preventing the anode operating medium from entering the plurality of fuel cells;
   opening of the anode discharge adjusting means after reaching the threshold pressure in the anode inlet channel
   introducing of the anode operating medium by means of subcritical operation of an operating medium conveying mechanism; and
   converting to a supercritical operation of the operating medium conveying mechanism before or at the same time as the opening of the anode discharge adjusting means.

2. The method according to claim 1 further comprising:
   setting a voltage limit of a DC voltage converter and establishing an electrical connection between the DC voltage converter and at least one fuel cell of the plurality of fuel cells before the introducing of the anode operating medium into the anode supply line.

3. The method according to claim 1, further comprising creating an electrical current with depletion of oxygen by evenly flowing the anode operating medium into an active area of the plurality of fuel cells after the opening of the anode discharge adjusting means.

4. The method according to of claim 1, further comprising:
   activating of a recirculation conveying mechanism arranged in a recirculation line connecting the anode supply line and the anode exhaust line before or at the same time as the opening of the anode discharge adjusting means.

5. The method according to claim 4, further comprising:
   blocking the recirculation line or operating the recirculation conveying mechanism in reverse mode during the introducing of the anode operating medium; and
   unblocking the recirculation line or converting the recirculation conveying mechanism to normal mode before or at the same time as the opening of the anode discharge adjusting means.

6. The method according to claim 1, further comprising:
   recording a stack voltage according to a predetermined first time frame;
   determining a second time frame by means of the recorded stack voltage; and
   closing the anode discharge adjusting means after the first time frame and the second time frame.

7. The method according to claim 1, further comprising:
   blocking a first cathode separator, a second cathode separator, the first cathode separator in a cathode supply line and the second cathode separator in a cathode exhaust line; and
   activating of a compressor in the cathode supply line in response to a wastegate adjusting means opening before opening of the anode discharging adjusting means.

8. The method according to claim 7, further comprising:
   closing of the wastegate adjusting means by means of a control process;
   opening of the first cathode separator and of the second cathode separator; and
   converting to a controlled operation of the wastegate adjusting means.

9. The method according to claim 1, further comprising:
   recording a stack voltage according to a predetermined first time frame;
   determining a second time frame by means of the recorded stack voltage; and
   closing the anode discharge adjusting means in response to exceeding a threshold concentration of the anode operating medium in the fuel cell stack, the anode exhaust line, or a cathode exhaust line.

10. The method according to claim 1, further comprising:
    recording a stack voltage according to a predetermined first time frame;
    determining a second time frame by means of the recorded stack voltage; and
    closing the anode discharge adjusting means in response to a voltage or current plateau.

* * * * *